(12) United States Patent
Tai et al.

(10) Patent No.: US 9,172,778 B2
(45) Date of Patent: Oct. 27, 2015

(54) PORTABLE TERMINAL DEVICE AND STATE SWITCHING STRUCTURE OF PORTABLE TERMINAL DEVICE

(75) Inventors: Ryusuke Tai, Tokyo (JP); Mitio Nagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 13/124,671

(22) PCT Filed: Oct. 27, 2009

(86) PCT No.: PCT/JP2009/068392
§ 371 (c)(1),
(2), (4) Date: May 11, 2011

(87) PCT Pub. No.: WO2010/050463
PCT Pub. Date: May 6, 2010

(65) Prior Publication Data
US 2011/0310023 A1    Dec. 22, 2011

(30) Foreign Application Priority Data

Oct. 31, 2008   (JP) ................................. 2008-282377

(51) Int. Cl.
*G06F 3/02* (2006.01)
*H04M 1/02* (2006.01)
*G06F 1/16* (2006.01)

(52) U.S. Cl.
CPC ........... *H04M 1/0237* (2013.01); *G06F 1/1622* (2013.01); *G06F 1/1624* (2013.01);
(Continued)

(58) Field of Classification Search
CPC ....... G06F 3/02; G06F 1/1622; G06F 1/1643; G06F 1/1681; H04B 1/08; H04M 1/0241; H04M 1/00; H04M 1/0237; H04M 1/0281; H04M 2250/22; H04M 1/0233; H04M 1/0227
USPC ....................................... 345/169; 455/575.1
See application file for complete search history.

(56) References Cited

U.S. PATENT DOCUMENTS

| | | | |
|---|---|---|---|
| 2005/0125570 A1 | 6/2005 | Olodort et al. | |
| 2006/0030381 A1* | 2/2006 | Byun et al. | 455/575.4 |
| 2008/0036452 A1* | 2/2008 | Hirayama | 324/207.2 |
| 2008/0045279 A1* | 2/2008 | Ohki | 455/575.1 |

FOREIGN PATENT DOCUMENTS

| | | |
|---|---|---|
| CN | 101036374 A | 9/2007 |
| EP | 1798940 A1 | 6/2007 |

(Continued)

OTHER PUBLICATIONS

International Search Report for PCTLIP20091068392 mailed Feb. 2, 2010.

(Continued)

*Primary Examiner* — Towfiq Elahi

(57) ABSTRACT

Solved is a problem of difficulty in operating, with an operation unit casing held by one hand, both of a touch panel and a key operation unit without changing the hand which holds the unit.
A portable terminal device comprising an operation unit casing 10 having a key operation unit 15 formed of a key switch and a display unit casing 20 having a display unit and a touch panel 30, in which the display unit casing is laterally positioned with respect to the operation unit casing such that both of the key operation unit 15 and the touch panel 30 are operable by one-handed operation by a hand which holds the operation unit casing 10.

10 Claims, 12 Drawing Sheets

(52) U.S. Cl.
CPC ............ *G06F1/1643* (2013.01); *G06F 1/1681* (2013.01); *H04M 1/0281* (2013.01); *H04M 1/0227* (2013.01); *H04M 1/0233* (2013.01); *H04M 2250/22* (2013.01)

(56) References Cited

FOREIGN PATENT DOCUMENTS

| | | |
|---|---|---|
| JP | 2003179678 A | 6/2003 |
| JP | 2008092176 A | 4/2008 |
| JP | 2008092264 A | 4/2008 |
| WO | 2005071928 A1 | 8/2005 |
| WO | 2006038499 A | 4/2006 |
| WO | 2006038554 A | 4/2006 |

OTHER PUBLICATIONS

The extended European search reproart for PCT/JP2009068392 dated on May 7, 2012.

Chinese Office Action for CN Application No. 200980143852.3 issued on Apr. 22, 2013 with English Translation.

\* cited by examiner

30: TOUCH PANEL
201: FRONT CASE
202: REAR COVER
204: DISPLAY DEVICE
205: DISPLAY DEVICE FRAME
206: SCREEN

FIG. 8
(A) MAIN STATE
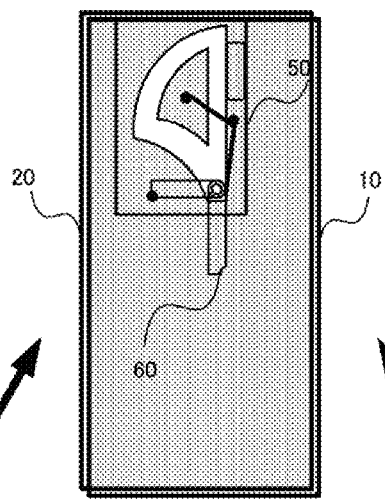
(B) LATERAL STATE
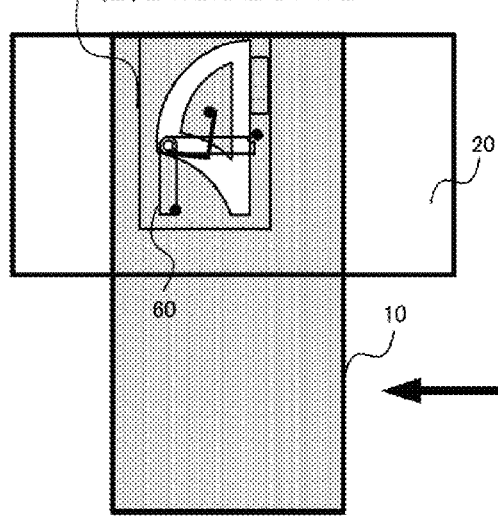
(C) SLIDING STATE
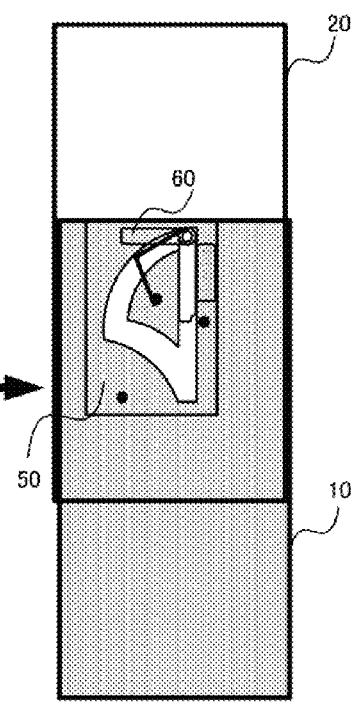

PORTABLE TERMINAL DEVICE AND STATE SWITCHING STRUCTURE OF PORTABLE TERMINAL DEVICE

INCORPORATION BY REFERENCE

This application is the National Phase of PCT/JP2009/068392, filed Oct. 27, 2009, which is based upon and claims the benefit of priority from Japanese patent application No. 2008-282377, filed on Oct. 31, 2008, the disclosure of which is incorporated herein in its entirety by reference.

TECHNICAL FIELD

The present invention relates to a portable terminal device such as a cellular phone and, more particularly, a portable terminal device comprising a key operation unit and a touch panel as an input device.

BACKGROUND ART

Current portable terminal device such as a cellular phone has its structure and operating method more and more diversified due to diversification of service and multi-function of terminals. Proposed are, for example, a portable terminal having a structure to execute screen operation or character input only through a touch panel or a touch sensor provided on a display screen without the provision of a hard key and a portable terminal device having a structure to enable switching of a state of no operation key which enables simple operation by a touch panel or a touch sensor, a vertically long screen state suitable for telephone communication and mail operation and a horizontally long screen state suitable for one-segment broadcasting viewing and full-browser operation according to a purpose of use.

Examples of portable terminal devices of this kind are disclosed in, for example, Patent Literature 1 and Patent Literature 2.

The portable information terminal recited in the Patent Literature 1 has a structure comprising a first connecting shaft which connects an operation unit casing and a display unit casing so as to open and close and a second connecting shaft which allows the display unit casing in an open state to rotate laterally, which structure enables the display unit casing to open to have the vertically long screen state and further enables the display unit casing in the open state to be laterally positioned to switch to the horizontally long screen state.

Also disclosed in Patent Literature 1 is a structure in which with a third rotation shaft that allows the display unit casing in the open state to rotate inside out, the display unit casing is superposed on the operation unit casing with its display surface as the upper side to have the no-operation key state by closing the display unit casing inside out.

Furthermore, the portable terminal recited in Patent Literature 2 has a structure in which the display unit casing is superposed on the operation unit casing to have the no-operation key state, the display unit casing is slid upwardly on the operation unit casing to have a vertically long screen and the display unit casing in the vertically long screen state is further rotated to have a horizontally long screen.

Patent Literature 1: WO 2006-038554A
Patent Literature 2: Japanese Patent Laying-Open No. 2008-92264.

A portable terminal structured to execute screen operation and character input only by a touch panel or a touch sensor provided on a display screen with no hard key provided has a shortcoming that while such operation as selection of an input item on the screen or screen scrolling can be realized with relative ease by using a touch panel, operability of character input is considerably reduced as compared with hardware key switching.

The portable terminal recited in Patent Literature 1 structured to open a display unit casing to have the vertically long screen state, laterally position the display casing being opened to switch to the horizontally long screen state and further close the display unit casing inside out to have the no-operation key state has a shortcoming that switching from the vertically long screen state to the horizontally long screen state and further switching to the no-operation key state cannot be realized with ease only by one hand holding the terminal.

Furthermore, while the portable terminal recited in Patent Literature 1 enables one hand holding the terminal to realize key operation using the key input unit in the vertically long screen state or the horizontally long screen state, with respect to operation by the touch panel on the screen, it requires a hand holding the terminal to be switched in order to make a thumb of the hand holding the terminal reach the whole area of the touch panel or requires operation by using the other free hand. It therefore has a problem that both of the operations using the key input unit and the touch panel cannot be executed comfortably only by one hand holding the terminal.

When both a touch panel and a hard key are mounted on a cellular phone or the like, it has been difficult to operate both the touch panel and the hard key while holding the operation unit by one hand without switching the hand holding the device because of a structure of the casing. When a touch panel is added as an input device to a portable terminal comprising a key operation unit as a hard key, a casing should be designed to allow comfortable operation of both the key operation unit and the touch panel.

The portable terminal recited in Patent Literature 2 has a problem that because the display unit fails to have a touch panel, character inputting and screen operation should be executed only by key operation using a key input unit of the operation unit casing, resulting in having considerably inferior operability in screen operation as compared with a portable terminal having a touch panel.

In addition, to be brought into the horizontally long screen state, the portable terminal recited in Patent Literature 2 needs to be once put into the vertically long screen state from the no-operation key state by the sliding of the display unit casing along the operation unit casing upwardly and also to be brought into the no-operation state from the horizontally long screen state, needs to be once put into the vertically long screen state from the horizontally long screen state. It is therefore impossible to directly switch from the no-operation key state to the horizontally long screen state and from the horizontally long screen state to the no-operation key state. In other words, switching from the no-operation key state to the horizontally long screen state and from the horizontally long screen state to the no-operation key state is impossible unless passing through the vertically long screen state, so that state switching operation costs labor.

OBJECT OF THE INVENTION

An object of the present invention is to solve the above-described problems and provide a portable terminal device and a state switching structure of the portable terminal device which allow one hand holding a terminal device to realize comfortable operation using a touch panel and a key operation unit with ease.

Another object of the present invention is to provide a portable terminal device and a state switching structure of the portable terminal device which allow one hand holding a terminal device to realize switching among the no-operation key state, the vertically long screen state and the horizontally long screen state with ease.

SUMMARY

According to a first exemplary aspect of the invention, a portable terminal device, includes an operation unit casing having a first input unit formed of a key switch and a display unit casing having a second input unit formed of a display unit and a touch panel, wherein the display unit casing is laterally positioned with respect to the operation unit casing such that the first input unit and the second input unit are operable by one-handed operation using a hand which holds the operation unit casing.

According to a second exemplary aspect of the invention, a state switching structure of a portable terminal device, wherein connection is made to allow switching by one-handed operation between two states, a state where a display unit casing having a second input unit formed of a display unit and a touch panel overlaps an operation unit casing having a first input unit formed of a key switch and a state where the display unit casing is laterally positioned on the upper part of the operation unit casing.

According to a third exemplary aspect of the invention, a state switching structure of a portable terminal device, wherein connection is made to allow switching by one-handed operation among three states, a state where a display unit casing having a second input unit formed of a display unit and a touch panel overlaps an operation unit casing having a first input unit formed of a key switch, a state where the display unit casing slides upwardly on the operation unit casing to locate and a state where the display unit casing is laterally positioned on the upper part of the operation unit casing.

According to the present invention, with a display unit casing laterally arranged with respect to an operation unit casing, comfortable operation using the entire area of a touch panel and the key operation unit can be realized by one-handed operation by a hand holding the operation unit casing. Also possible is switching among the no-operation key state, the vertically long screen state and the horizontally long screen state with ease by one hand holding a terminal device. In addition, since the touch panel is operated with the operation unit casing held, erroneous operation caused by erroneous touching of the touch panel is very unlikely, which enables comfortable operation by the touch panel.

BRIEF DESCRIPTION OF THE DRAWINGS

FIG. 8 is a diagram showing details of a hinge mechanism 40 of the portable terminal device in each operation state according to the first exemplary embodiment;

EXEMPLARY EMBODIMENT

Next, exemplary embodiments of the present invention will be described in detail with reference to the drawings.

First Exemplary Embodiment

Figure 1:
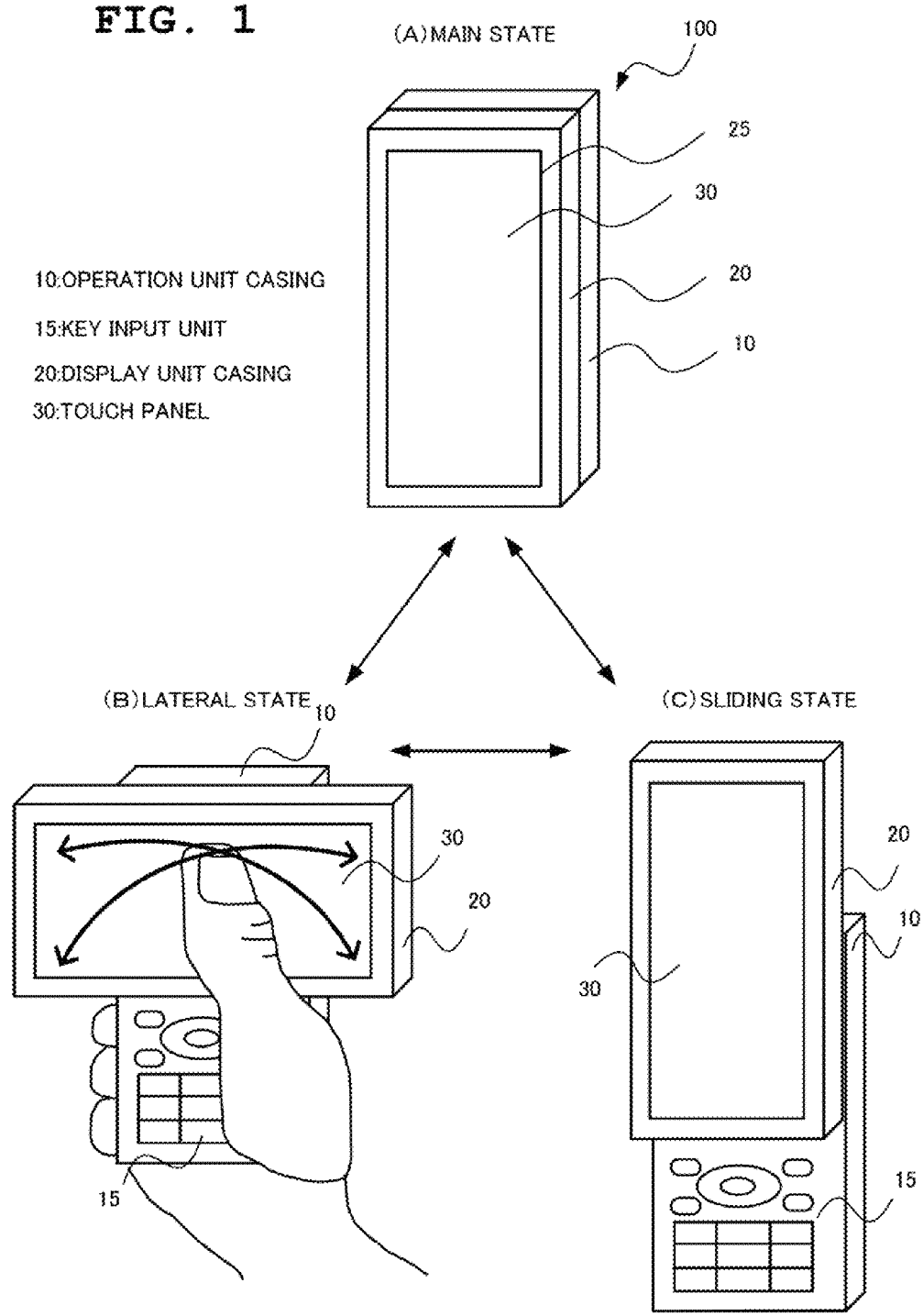
FIG. 1 is a diagram showing an appearance and an operation state of a portable terminal device according to a first exemplary embodiment of the present invention.

FIG. 1 shows an outer structure of a portable terminal device according to a first exemplary embodiment of the present invention. A portable terminal device 100 according to the present exemplary embodiment has an operation unit casing 10 having a key operation unit 15 as a first input unit, and a display unit casing 20 with a touch panel 30 as a second input unit incorporated into a display unit 25. The portable terminal device according to the present exemplary embodiment has a shape and a structure suitable for operation using a touch panel.

The operation unit casing 10 has a CPU, a main storage unit or the like built in as a hardware part which realizes various kinds of functions that the portable terminal device 100 comprises.

The key operation unit 15, which is disposed at a bottom part of the front surface of the operation main body 10, is realized by such a key as structured to be entered by direct pressing or by a key structured to be entered by touching.

Figure 3:
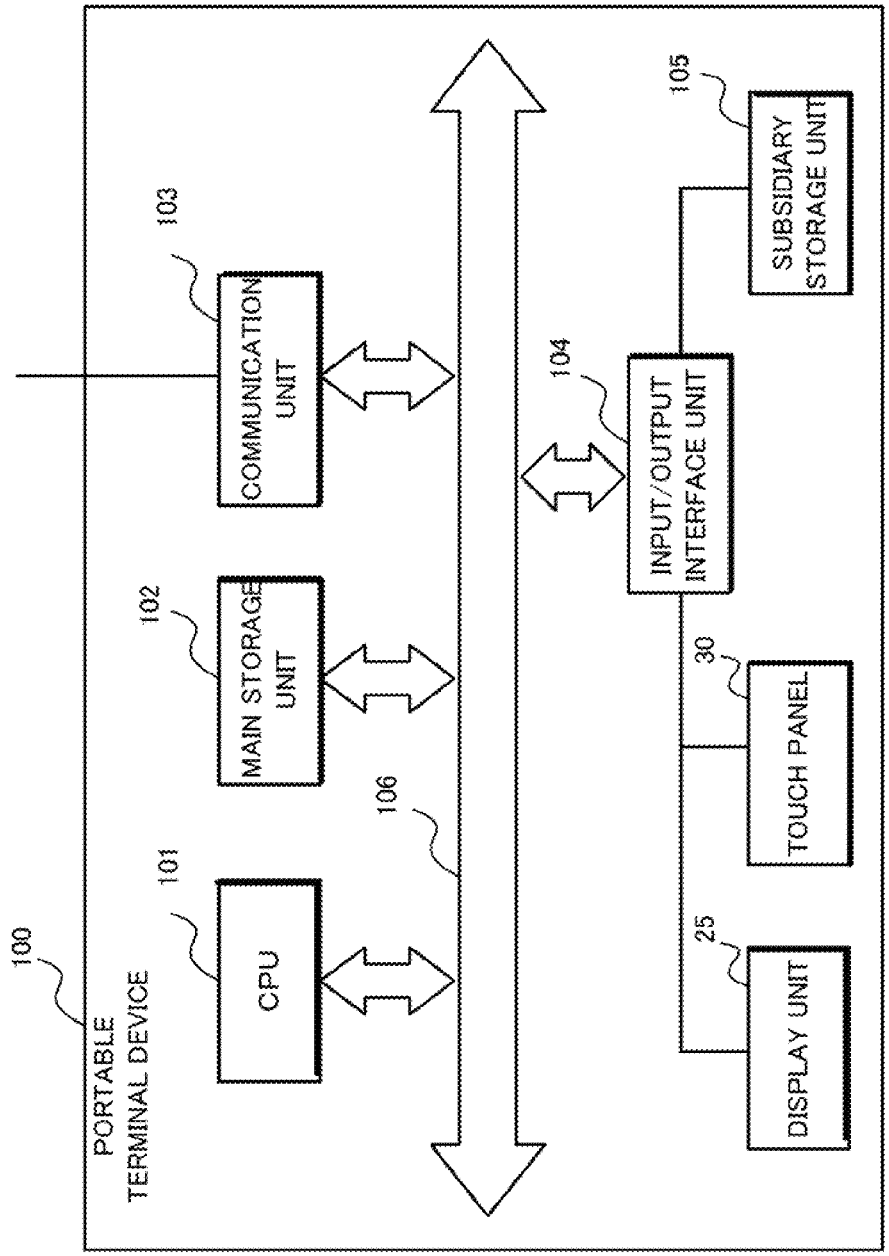
FIG. 3 is a block diagram showing an example of a hardware structure of the portable terminal device according to the first exemplary embodiment.

Example of a hardware structure of the portable terminal device 100 is shown in FIG. 3. With reference to FIG. 3, the portable terminal device 100, which can be realized by the same hardware structure as that of a common computer device, comprises a CPU (Central Processing Unit) 101, a main storage unit 102 formed of an RAM (Random Access Memory) or the like for use as a data working region or a data temporary saving region, a communication unit 103 which transmits and receives data through a network, an input/output interface unit 104 which transmits and receives data, a subsidiary storage unit 105 as a hard disk device formed of a non-volatile memory such as a ROM (Read Only Memory), a magnetic disk or a semiconductor memory, a system bus 106 which connects the above-described respective components with each other, the display unit 25, the key operation unit 15 and the touch panel 30 as an input device.

The portable terminal device 100 according to the present exemplary embodiment is realized in software by storing a program which provides each kind of functions that the portable terminal device 100 comprises in the subsidiary storage unit 105, loading the program into the main storage unit 102 and executing the same by the CPU 101.

According to the present exemplary embodiment, attaching a hinge mechanism 40 between the display unit casing 20 and the operation unit casing 10 realizes a portable terminal device which has three states (A) a main state which is a no-operation key state, (B) a lateral state (horizontally long screen state) and (C) a sliding state (vertically long screen state).

The operation unit casing 10 and the display unit casing 20 are connected with each other by the hinge mechanism 40, which hinge mechanism 40 enables the display unit casing 20 to rotate or slide with respect to the operation unit casing 10.

Outer sizes of the operation unit casing 10 and the display unit casing 20 are approximately the same, which are, for example, sizes enabling, when the device is held by one hand, a thumb of the hand holding the device to touch and operate the touch panel 30 without the need of switching the hand. As one example, it is preferably a longitudinal form whose height is in the order of 100 mm in terms of one-handed operability.

Rotating or sliding the display unit casing 20 by the hinge mechanism 40 enables the state of the display unit casing 20 to switch as shown in the figure. More specifically, the three states can be taken, the main state where the display unit casing 20 is positioned overlapping the operation unit casing 10, the lateral state where the display unit casing 20 is positioned laterally on the upper part of the operation unit casing 10 and the sliding state where the display unit casing 20 upwardly slides along the operation unit casing 10 to locate.

(A) Main State

Figure 2:
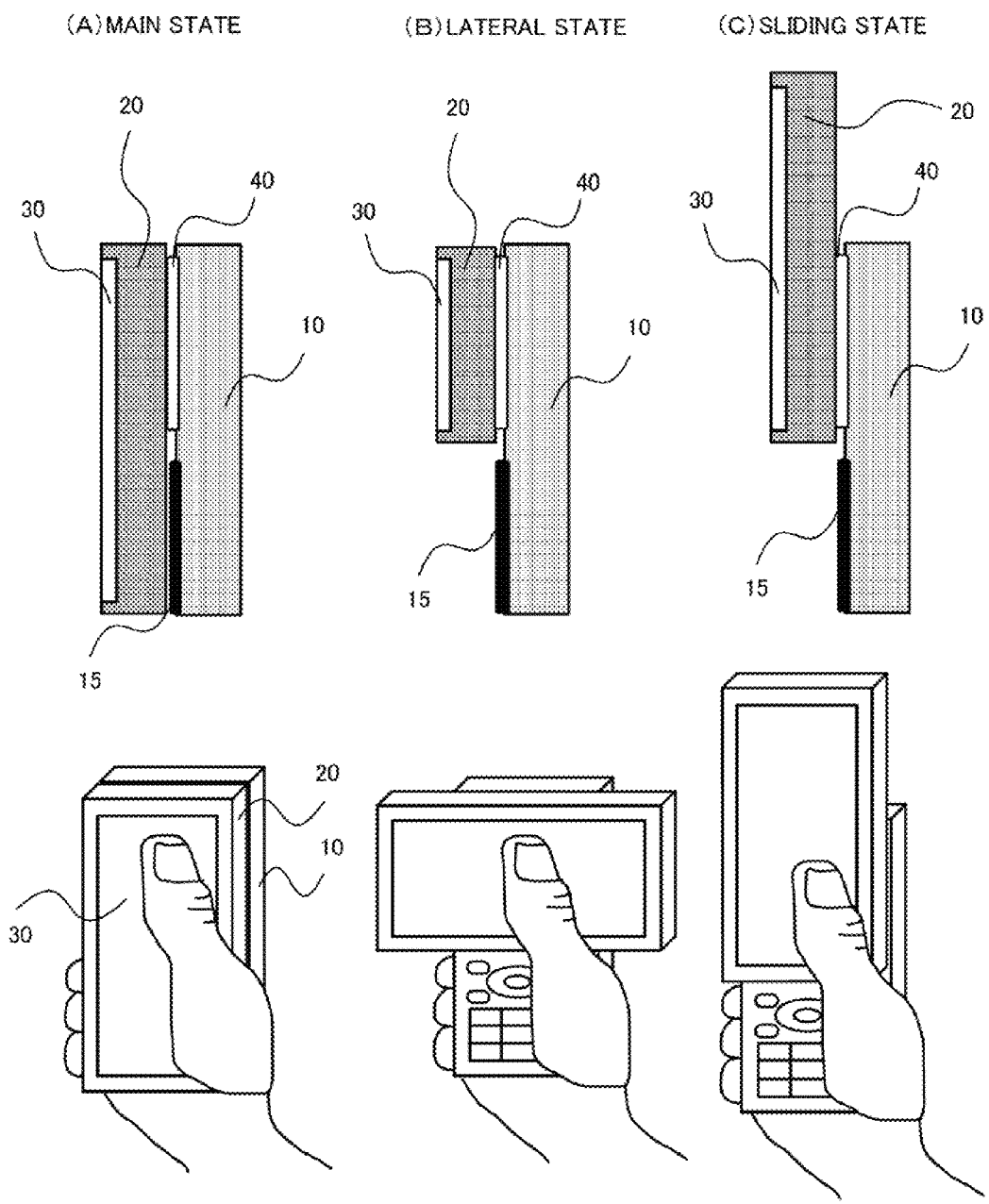
FIG. 2 is a diagram showing a state of operation of the portable terminal device according to the first exemplary embodiment.

As shown in FIG. 1(A) and FIG. 2(A), this is a state where the display unit casing 20 is positioned overlapping the front surface of the operation unit casing 10. In this state, since the key operation unit 15 of the operation unit casing 10 is hidden by the display unit casing 20, with the portable terminal device held by one hand, screen operation or character input is realized by touching the touch panel 30 by a thumb of the hand holding the device as shown in FIG. 2(A).

(B) Lateral State

As shown in FIG. 1(B) and FIG. 2(B), this is a state where the display unit casing 20 is rotated to be placed laterally on the upper part of the operation unit casing 10. In this case, the upper side surface of the laterally positioned display unit casing 20 is brought to be substantially flush with the upper side surface of the operation unit casing 10. Since in this state, on the upper part of the operation unit casing 10, the display unit casing 20 is laterally located to expose the key operation unit 15 provided on the lower part of the operation unit casing 10, screen operation or character input is realized by operating both the key operation unit 15 and the touch panel 30 by a thumb of a hand holding the portable terminal device as shown in FIG. 2(B).

(C) Sliding State

This is a state where the display unit casing 20 is slid upwardly along the operation unit casing 10 to locate as shown in FIG. 1(C) and FIG. 2(C). In this state, since the display unit casing 20 slides upwardly in the vertically long screen state to expose the key operation unit 15 of the operation unit casing 10, when operating by one hand holding the device, the operation will be realized mainly by using the key operation unit 15.

The display unit 25, which is structured to have the touch panel 30 on the liquid crystal display screen, enables selection or screen operation of various kinds of items by touching the screen by a finger, a stylus or the like, with various kinds of information displayed on the display screen.

In the present exemplary embodiment, on the surface of a display device such as an LCD forming the display unit 25 of the display unit casing 20, the touch panel 30 is mounted which is of matrix switch type, resistance film type, surface acoustic wave type, electromagnetic induction type, electrical capacitance type, optical type or the like.

Figure 4:
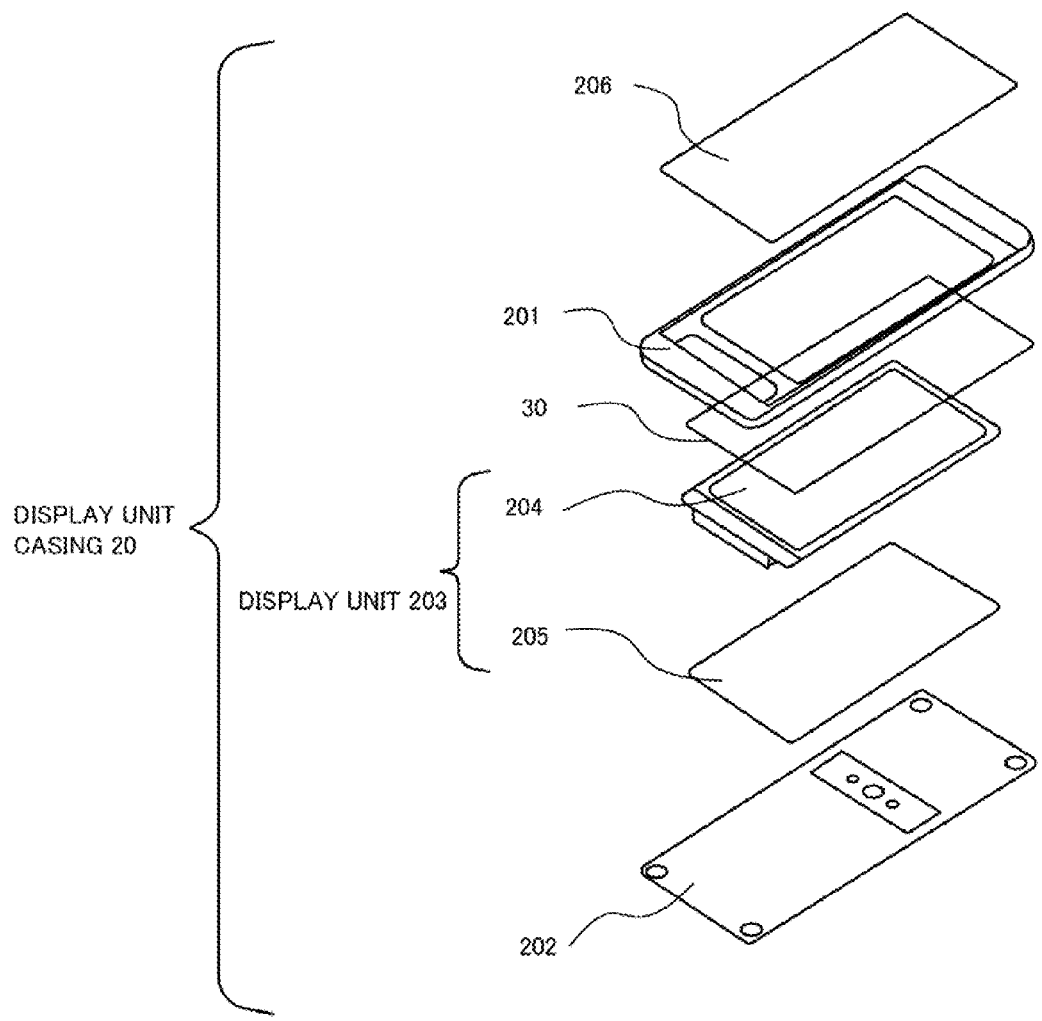
FIG. 4 is an exploded perspective view showing an example of a structure of a display unit casing of the portable terminal device according to the first exemplary embodiment.

Example of a structure of the display unit casing 20 is shown in FIG. 4. In the structure example of FIG. 4, the display unit casing 20 is structured to have the touch, panel incorporated between a front case 201 and a rear cover 202 made of resin so as to be placed on the surface of a display unit 203 formed of a display device 204 and a display device frame 205. On the surface of the front case 201, a screen 206 made of acryl or glass is attached for the protection of the touch panel.

Figure 5:
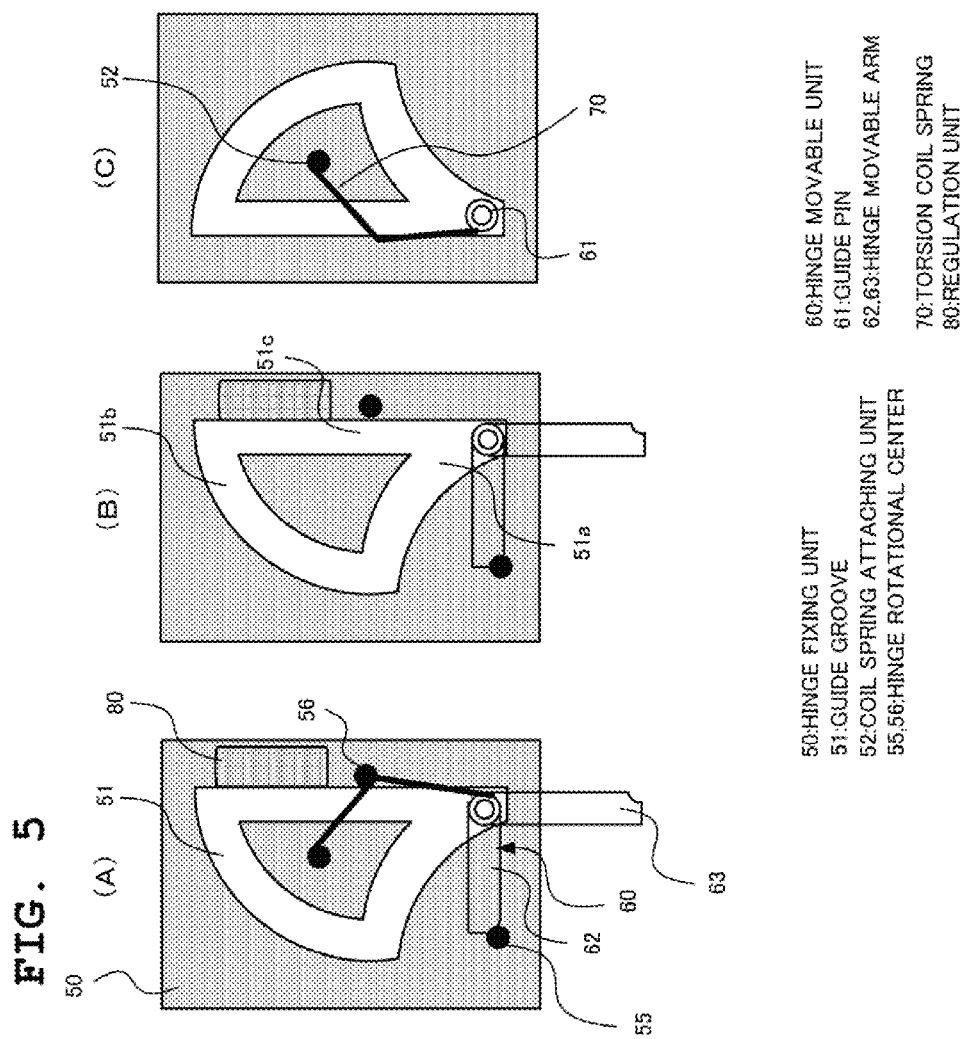
FIG. 5 is a diagram showing an example of a structure of a hinge mechanism of the portable terminal device according to the first exemplary embodiment.

With reference to FIG. 5, the structure of the hinge mechanism 40 will be described. FIG. 5(A) is a perspective view of a state of the hinge mechanism 40, FIG. 5(B) is a view of a state of the hinge mechanism 40 seen from the front side and FIG. 5(C) is a view of a state of the hinge mechanism 40 seen from the back side.

The hinge mechanism 40 includes a hinge fixing unit 50 to be attached on the side of the operation unit casing 10, a hinge movable unit 60 to be attached on the rear side of the display unit casing 20, a torsion coil spring 70 and a regulation unit 80 which regulates movement of the hinge movable unit 60.

A guide pin 61 provided in the hinge movable unit 60 engages with a guide groove 51 of the hinge fixing unit 50. One end of the guide pin 61 is fixed to the display Unit casing 20 and the other end of the guide pin 61 is allowed to move through the guide groove 51 without dropping from the groove.

On the rear side of the hinge fixing unit 50, the torsion coil spring 70 is arranged. One end of the torsion coil spring 70 is connected to the guide pin 61 and the other end is connected to a coil spring attaching unit 52 provided on the rear surface of the hinge fixing unit 50.

The torsion coil spring 70 is connected to freely rotate centered around the coil spring attaching unit 52.

The hinge movable unit 60 has hinge movable arms 62 and 63 which form an angle of approximately 90 degrees. When the hinge movable unit 60 moves within the guide groove 51, recesses provided at the heads of the hinge movable arms 62 and 63 smoothly execute operation of locking into a hinge rotational center unit 55 and a hinge rotational center unit 56 provided in the hinge fixing unit 50 and operation of releasing locking. Details of the operation of the hinge mechanism 40 will be described later.

Figure 6:
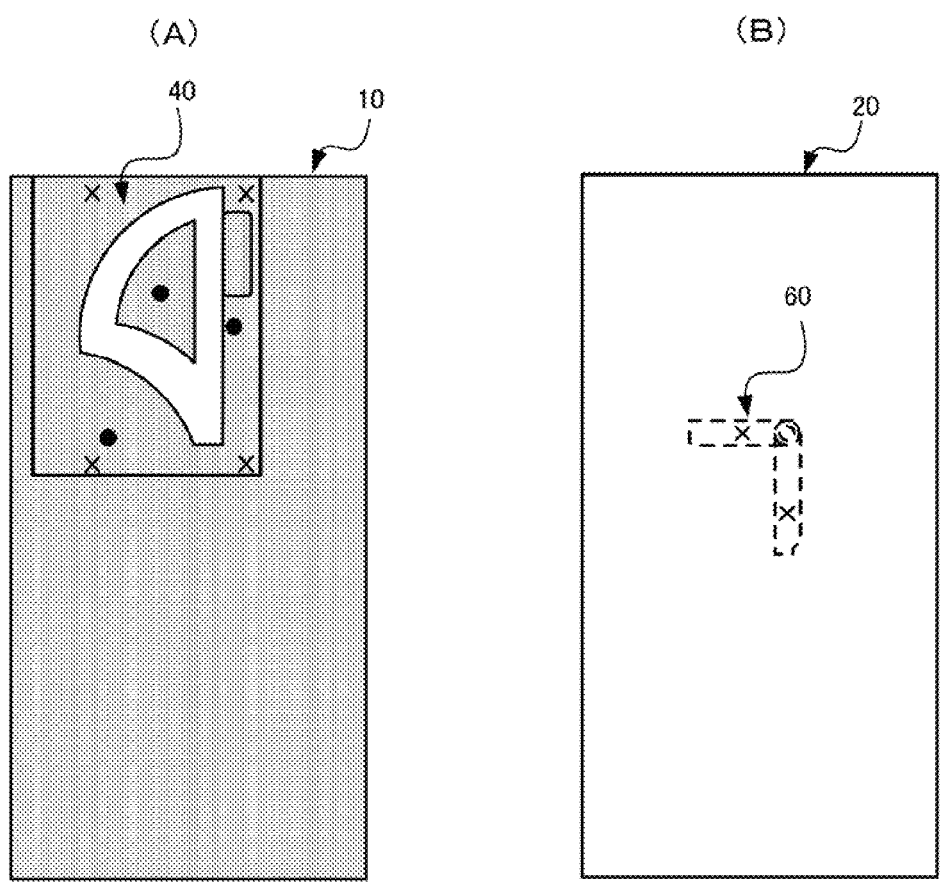
FIG. 6 is a diagram showing a method of attaching the hinge mechanism of the portable terminal device to a casing according to the first exemplary embodiment.

With reference to FIG. 6, description will be made of a method of attaching the hinge fixing unit 50 and the hinge movable unit 60 forming the hinge mechanism 40 to the operation unit casing 10 and the display unit casing 20.

The hinge fixing unit 50 is fixed on the upper part of the surface of the operation unit casing 10 by a screw or a calking as shown in FIG. 6(A). In the figure, the x mark indicates a fixing position of the hinge fixing unit 50 to the operation unit casing 10. The torsion coil spring 70 lies in a clearance provided between the hinge fixing unit 50 and the operation unit casing 10 so as not to interfere with the hinge fixing unit 50 and the operation unit casing 10.

The hinge movable unit 60 is fixed approximately at the center of the rear side of the display unit casing 20 by a screw or a calking as shown in FIG. 6(B). In the figure, the x mark indicates a fixing position of the hinge movable unit 60 to the display unit casing 20.

Operation of the First Exemplary Embodiment

Figure 7:
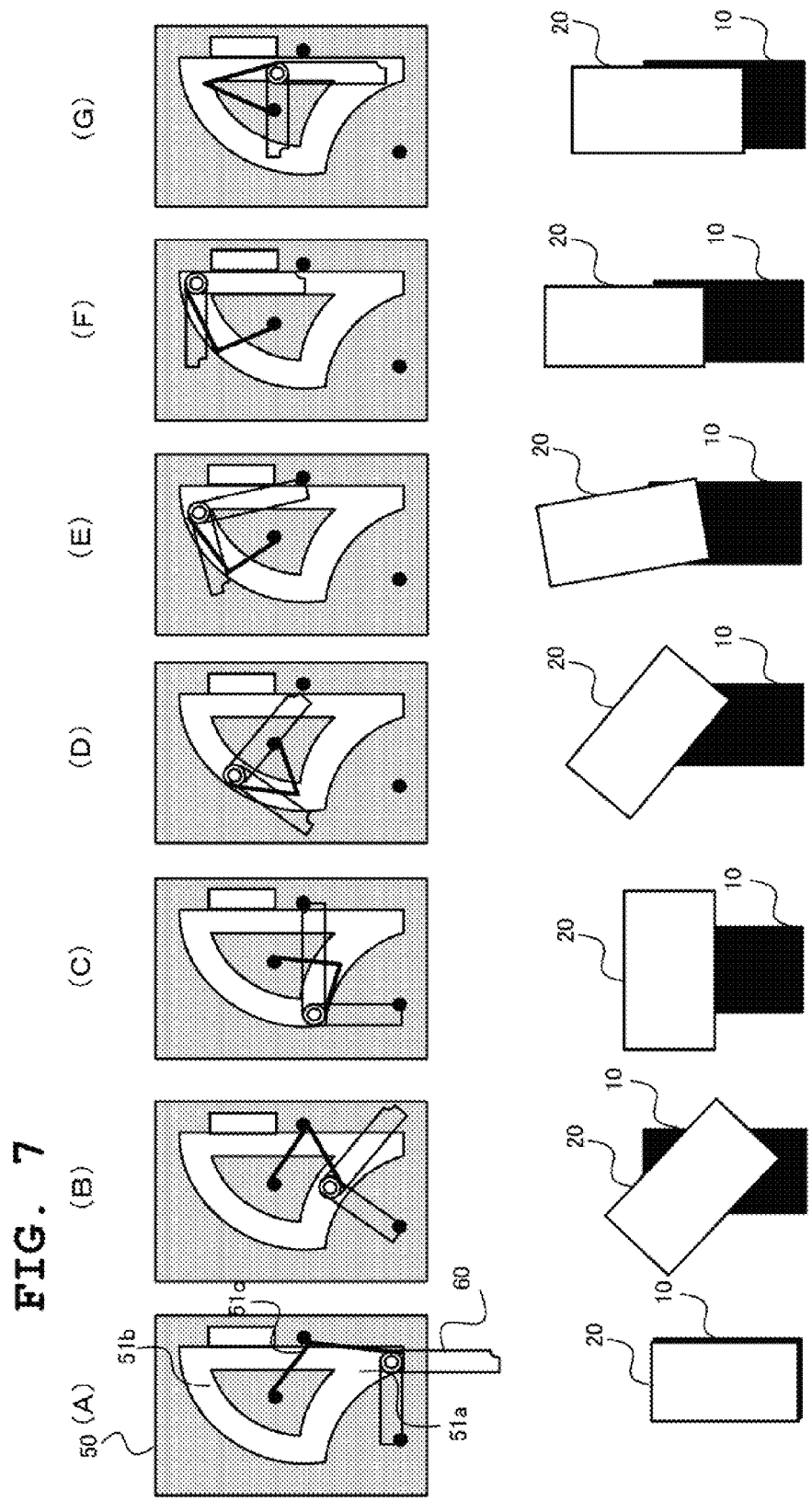
FIG. 7 is a diagram showing operation of the hinge mechanism of the portable terminal device according to the first exemplary embodiment.

Description will be made of operation of switching of a use state by the hinge mechanism 40 of the portable terminal device 100 structured as described above according to the present exemplary embodiment with reference to FIG. 7.

Description will be made of transition from a state (A) to a state (G), in which the display unit casing 20 is switched from the main state to the lateral state, further switched from the lateral state to the sliding state and further switched from the sliding state to the main state.

State (A): In the main state, the guide pin 61 is located at an intersection between a groove 51a and a groove 51c of the guide groove 51 of the hinge fixing unit 50. At this time, the recess of the head of the hinge movable arm 62 engages with the hinge rotational center unit 55 and the guide pin 61 is pushed against the intersection between the groove 51a and the groove 51c by the elasticity of the torsion coil spring 70. This makes the hinge movable unit 60 fixed in the state shown in the figure to maintain the main state. Details of the hinge mechanism 40 in this state are shown in FIG. 8(A).

State (B): When the display unit casing 20 is rotated counterclockwise with respect to the operation unit casing 10, the head of the hinge movable arm 62 rotates centered on the rotational center unit 55 while being engaged, so that the guide pin 61 moves along the groove 51a of the guide groove 51. At this time, because the guide pin 61 is pushed along the groove 51a of the guide groove 51 to the side of the intersection with the grove 51b by the elasticity of the torsion coil spring 70, the hinge movable unit 60 is not allowed to maintain the state (B), so that the state automatically shifts to the state (A) or a state (C). Assume here that the display unit casing 20 is further rotated counterclockwise by using a thumb or the like of a hand holding the portable terminal device to shift to the next state (C).

State (C): The guide pin 61 is located at the intersection between the groove 51a and the groove 51b of the guide groove 51 of the hinge fixing unit 50. At this time, the recess at the head of the hinge movable arm 62 engages with the hinge rotational center unit 55 and the recess at the head of the hinge movable arm 63 engages with the hinge rotational center unit 56, while the guide pin 61 is pushed against the intersection between the groove 51a and the groove 51b by the elasticity of the torsion coil spring 70. This makes the hinge movable unit 60 fixed in the state shown in the figure to result in maintaining the lateral state where the display unit casing 20 is placed laterally with respect to the operation unit casing 10. Details of the hinge mechanism 40 in this state are shown in FIG. 8(B).

State (D): When the display unit casing 20 in the state (C) is rotated clockwise with respect to the operation unit casing 10, the head of the hinge movable arm 63 of the hinge movable unit 60 rotates centered on the rotational center unit 56 while being engaged, so that the guide pin 61 moves along the groove 51b of the guide groove 51. At this time, because the guide pin 61 is pushed along the groove 51b of the guide groove 51 to the side of the intersection with the grove 51c by the elasticity of the torsion coil spring 70, the hinge movable unit 60 is not allowed to maintain the state (D), so that the state automatically shifts to the state (C) or a state (E). Assume here that the display unit casing 20 is further rotated clockwise by using a thumb or the like of a hand holding the portable terminal device to shift to the next state (E).

State (E): The guide pin 61 is positioned in the vicinity of the intersection between the groove 51b and the groove 51c of the guide groove 51 of the hinge fixing unit 50. At this time, the hinge movable arm 63 of the hinge movable unit 60 touches the regulation unit 80 to release the engagement with the rotational center unit 56, resulting in shifting to a state (F).

State (F): The guide pin 61 is located at the intersection between the groove 51b and the groove 51c of the guide groove 51 of the hinge fixing unit 50. At this time, the recess at the head of the hinge movable arm 63 engages with the hinge rotational center unit 56, while the guide pin 61 is pushed against the intersection between the groove 51b and the groove 51c by the elasticity of the torsion coil spring 70. This makes the hinge movable unit 60 fixed in the state shown in the figure to maintain the sliding state where the display unit casing 20 is slid upwardly on the operation unit casing 10. Upward and downward directions of the screen in the state (A) and the state (F) are the same. Details of the hinge mechanism 40 in this state are shown in FIG. 8(C).

State (G): When the display unit casing 20 is drawn to be close to the operation unit casing 10, the hinge movable unit 60 moves along the groove 51c of the guide groove 51 of the hinge fixing unit 50. At this time, the hinge movable unit 60 is not allowed to maintain the state (G) due to the elasticity of the torsion coil spring 70 and the configuration of the groove 51c of the guide groove 51, so that the state automatically shifts to the state (F) or the state (A). At this time, further pulling down the display unit casing 20 against the elasticity of the torsion coil spring 70 results in shifting to the main state shown in the state (A).

As described in the foregoing, the movement of the hinge mechanism 40 enables a use state to be switched from the main state (state where the display unit casing 20 is positioned overlapping the front surface of the operation unit casing 10) through the lateral state (state where the display unit casing 20 is rotated to be laterally positioned on the upper part of the operation unit casing 10) and the sliding state (state where the display unit casing 20 is slid upwardly on the device main body 10 to locate) to the main state.

Switching of the main state, the lateral state and the sliding state can be realized with ease by using one hand holding the portable terminal device 100.

Next, description will be made of a method of operating the portable terminal device 100 in the main state, the lateral state and the sliding state.

(1) Operating Method in Main State

In this state, since the display unit casing 20 overlaps with the operation unit casing 10, touching the touch panel 30 by using a thumb or the like of a hand holding the device realizes scrolling of a display screen of the display unit 25, selection of items displayed on the screen and character input.

In the main state, when the operation unit casing 10 is held by one hand, the device can be operated by touching the entire area of the touch panel 30 by the thumb of the hand holding the device.

(2) Operating Method in Lateral State

In this state, since the upper side of the display unit casing 20 laterally positioned on the upper part of the operation unit casing 10 is located to be substantially flush with the upper end of the operation unit casing 10, the height of the entire device is not so different from the height of the operation unit casing 10 itself. It is accordingly possible to operate the device by one hand holding the device as in the main state.

In addition, since the key operation unit 15 on the bottom part of the operation unit casing 10 is exposed, scrolling of the display screen of the display unit 25, selection of items displayed on the screen and the like are executed by touching the touch panel 30 by a thumb or the like of a hand holding the device and characters are input by operating the keys of the key operation unit 15.

In the above-described lateral state realized by using the hinge mechanism 40, when the operation unit casing 10 is held by one hand, it is possible to press the entire area of the touch panel 30 and all the keys of the key operation unit 15 by the thumb of the hand holding the device.

In this state, by distinguishably using the touch panel 30 suitable for screen operation and the key operation unit 15 suitable for character input, comfortable operation can be realized by one hand.

(3) Operating Method in Sliding State

Since in this state, the display unit casing 20 is slid upwardly on the operation unit casing 10 to locate, the method will include operating the key operation unit 15 of the operation unit casing 10 by the thumb of one hand holding the device and operating the touch panel 30 by a finger of the other hand. This sliding state is a state suitable mainly for telephone communication.

Next, description will be made of a specific operation example of the portable terminal device 100 in the lateral state according to the present exemplary embodiment with reference to FIG. 9 through FIG. 12.

Figure 9:
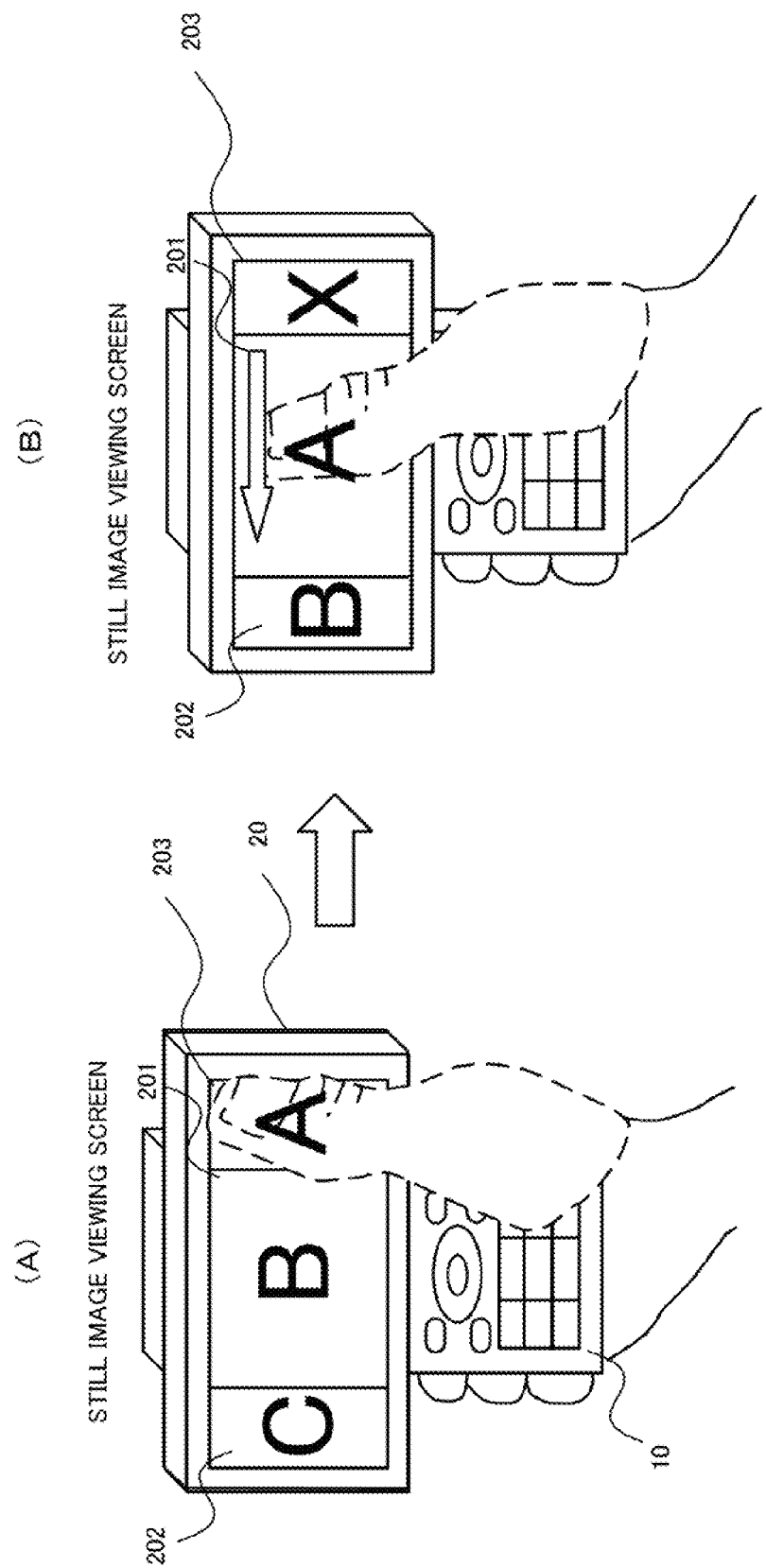
FIG. 9 is a diagram showing an example of specific operation of the portable terminal device in a lateral state according to the first exemplary embodiment.

FIG. 9 shows an example in which with the display unit 25 in the lateral state, display contents displayed on the screen are operated by touching the touch panel 30 of the display unit 25 by using a thumb of one hand holding the operation unit casing 10.

FIG. 9(A) shows an example of displaying of an image on a still image viewing screen, in which example the whole of an image B is displayed on the center screen 201 and a part of preceding and succeeding images A and C is displayed on left and right screens 202 and 203.

In this state, by touching the right side image A by a thumb to shift leftward (sweeping operation), the image A moves leftward to be displayed on the center screen 201 as shown in FIG. 9(B). Along with this, the image B moves leftward to the screen 202, so that an image X subsequent to the image A is displayed on the right side screen 203.

Touching the right side image C and sweeping the same rightward results in moving the image C to the center screen 201 and displaying the same.

In the state shown in FIG. 9(A), touching the screen and successively sweeping the same rightward or leftward enables images to be scrolled and displayed on the screen one after another.

Figure 10:
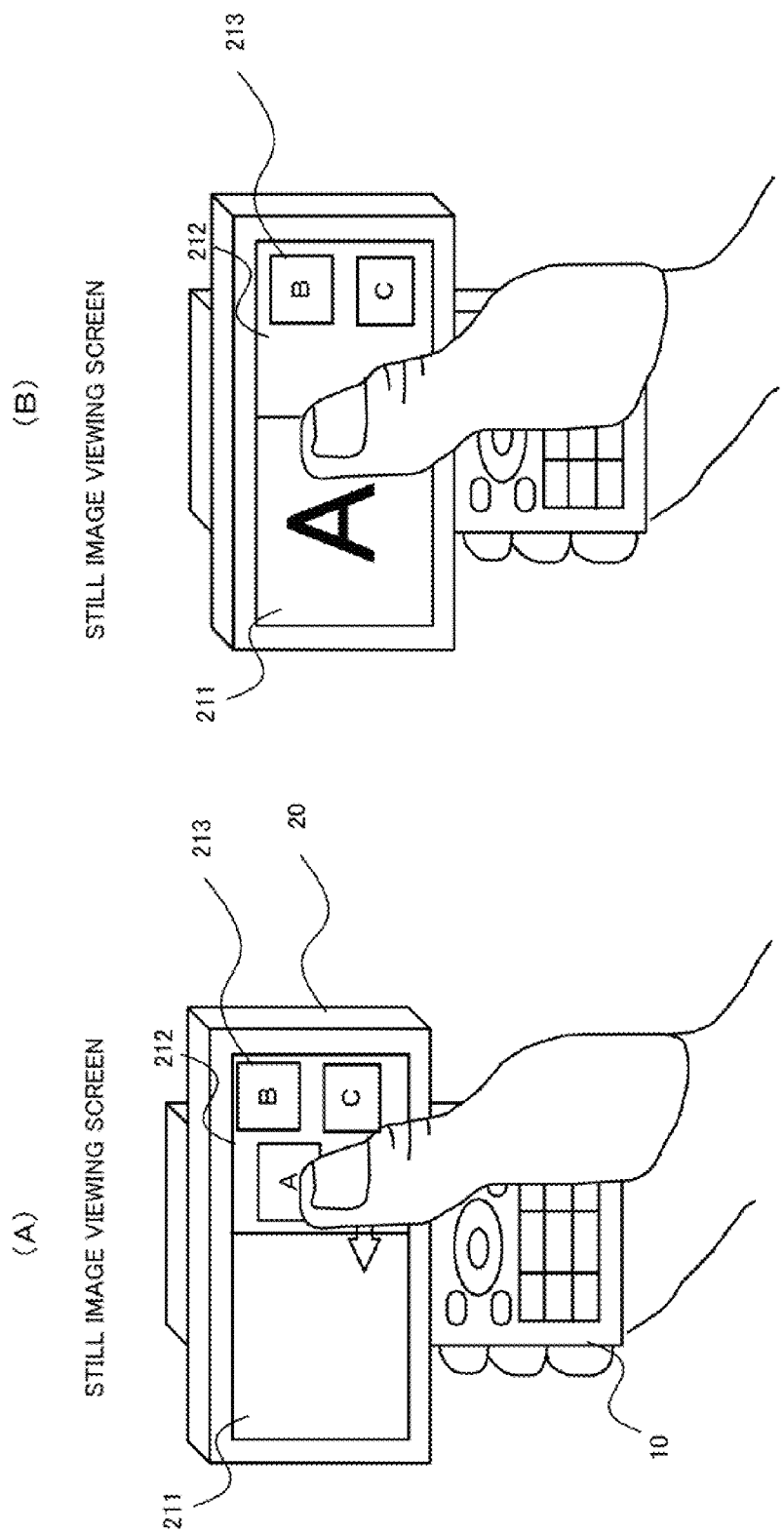
FIG. 10 is a diagram showing an example of specific operation of the portable terminal device in the lateral state according to the first exemplary embodiment.

FIG. 10 shows another example of a still image viewing screen, in which a screen of the laterally positioned display unit 25 is divided into a left screen and a right screen, with the right screen as a list screen 212 that displays icons 213 of the plurality of images A, B and C as data and the left screen as a viewer screen 211 that displays expanded images.

In the state of FIG. 10(A), by touching and selecting the icon 213 of a desired image displayed on the viewer screen 211 by a thumb of one hand holding the device (selecting the icon 213 of the image A in the example shown) and moving the icon to the left viewer screen 211 while touching the same and then dropping the thumb (dragging and dropping operation), the image A corresponding to the icon 213 is displayed in an expanded form on the left viewer screen 211 as shown in FIG. 10(B).

Figure 11:
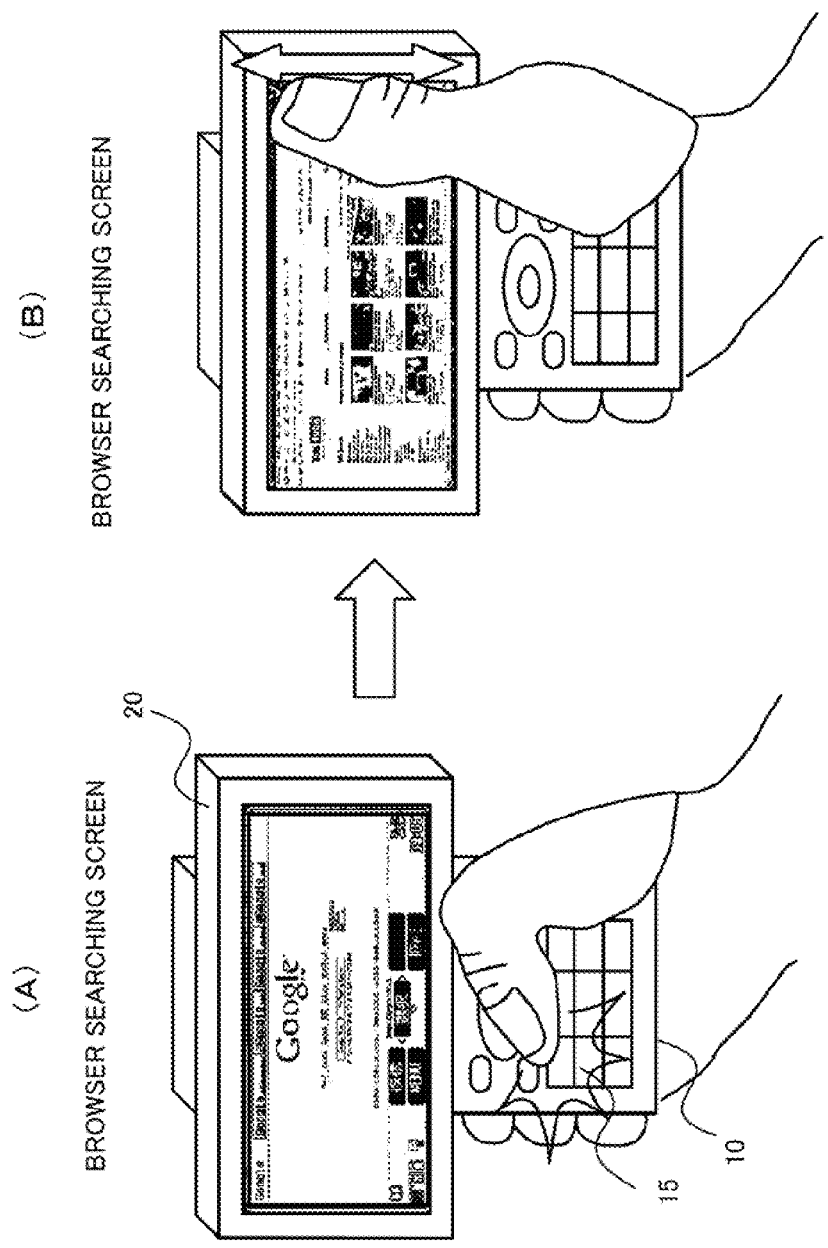
FIG. 11 is a diagram showing an example of specific operation of the portable terminal device in the lateral state according to the first exemplary embodiment.

FIG. 11 shows an example in which a browser searching screen for the searching on the Internet is displayed on the screen of the display unit 25 laterally positioned. In searching, a search keyword is input by using the key operation unit 15 by a thumb of one hand holding the operation unit casing 10 as shown in FIG. 11(A).

FIG. 11(B) shows a state where a search result obtained by an entered search keyword is displayed. Shown is a state where the screen of a search result is scrolled up and down by touching the screen of the search result by the thumb and sweeping the thumb up and down.

Figure 12:
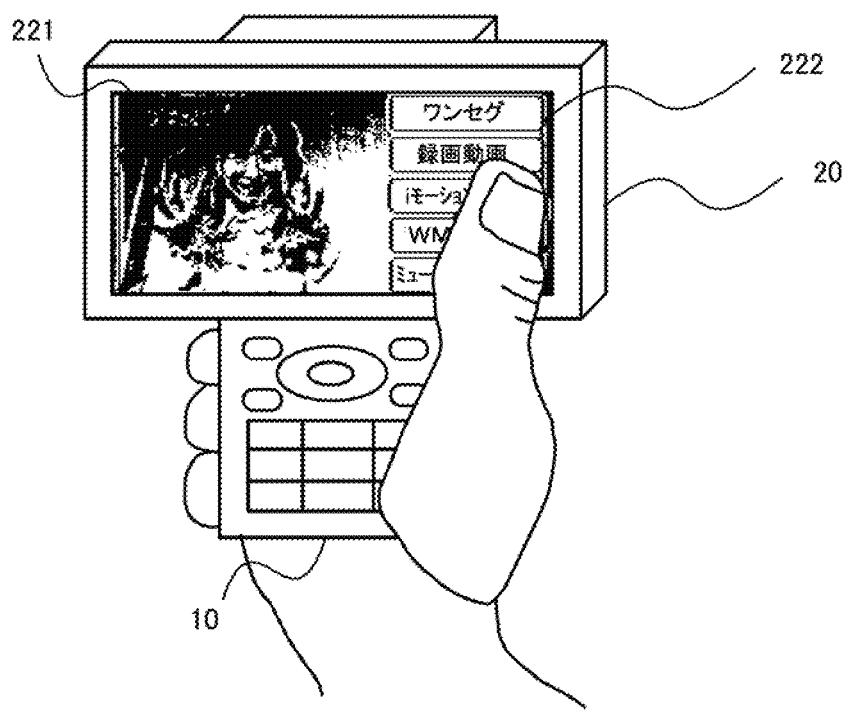
FIG. 12 is a diagram showing an example of specific operation of the portable terminal device in the lateral state according to the first exemplary embodiment.

FIG. 12 shows an example of a moving picture viewing and listening screen on which such a moving picture as one-segment broadcasting is used, which screen laterally positioned is divided into a left screen and a right screen, with the left screen as a display screen 221 on which such a moving picture as one-segment broadcasting is displayed and the right screen as an operation screen 222 on which operation for one-segment broadcasting viewing and listening is executed.

In this example, touching the operation screen 222 as the right screen by a thumb enables channel selection of one-segment broadcasting or selection of a moving picture file to be displayed on the display screen 221.

Effects of the First Exemplary Embodiment

In the lateral state and the sliding state, the present exemplary embodiment allows a thumb of one hand holding the operation unit casing 10 to operate the entire area of the touch panel 30 without changing the hand holding the terminal and also operate the key operation unit 15 of the operation unit casing 10 at the same time. In addition, since the touch panel 30 is operated while holding the operation unit casing 10, erroneous operation caused by erroneous touching of the touch panel 30 is very unlikely to occur, resulting in enabling comfortable touch panel operation.

It is also possible to switch among the no-operation key state, the vertically long screen state and the horizontally long screen state by one hand holding the portable terminal device 100.

Moreover, since touch panel operation is executed while holding the operation unit casing 10, it is very unlikely that erroneous touching of the panel 30 will cause erroneous operation, which enables comfortable operation by the touch panel.

Second Exemplary Embodiment

In the first exemplary embodiment, the touch panel 30 is mounted on the portable terminal device having three states, the main state, the lateral state and the sliding state, and both of the operation of the touch panel 30 and the operation of the key operation unit 15 are realized by one hand in the lateral state and the sliding state. Execution of both of the operation of the touch panel 30 and the operation of the key operation unit 15 by one hand, however, can be realized also by a portable terminal device only in a state where the display unit casing 20 is laterally positioned on the upper part of the operation unit casing 10.

In this case, none of the hinge mechanism 40 shown in the first exemplary embodiment is required and the operation unit casing 10 is fixedly attached to the display unit casing 20 to have a rotation angle of 90 degrees.

Third Exemplary Embodiment

While as to the structure of the display unit casing 20 shown in FIG. 4, shown is an example where the touch panel 30 and the display unit 203 are separate, a touch panel integrated display unit whose representative is an optical touch panel can be used as well. Use of such a touch panel integrated display unit enables the portable terminal device 100 to be reduced in size and thickness.

According to the present invention, applicable as the portable terminal device 100 is a cellular phone mounted with a touch panel or portable information communication apparatus in general.

Although the present invention has been described with respect to the preferred modes of implementation and exemplary embodiments in the foregoing, the present invention is not necessarily limited to the above-described modes of implementation and exemplary embodiments and can be implemented in various modifications within the scope of its technical idea.

While in the above-described exemplary embodiments, shown is an example where the hinge mechanism 40 having a rotating mechanism is provided between the display unit casing 20 and the operation casing unit 10 to switch among the main state, the lateral state and the sliding state, for example, any hinge mechanism is applicable that realizes the three states, the main state, the lateral state and the sliding state without being limited to the structure shown in the figure.

What is claimed is:

1. A portable terminal device, comprising:
   an operation unit casing having a first input unit formed of a key switch and a display unit casing having a second input unit formed of a display unit and a touch panel, wherein said display unit casing is laterally positioned with respect to said operation unit casing such that said first input unit and said second input unit are operable by operation using a hand which holds said operation unit casing,
   a connecting mechanism capable of switching, three states, a first state where said display unit casing overlaps said operation unit casing, a second state where said display unit casing slides upwardly on said operation unit casing to locate and a third state where said display unit casing is laterally positioned on an upper part of said operation unit casing,
   wherein said connecting mechanism is structured to switch from the first state to the second state directly,
   wherein said connecting mechanism is structured to switch from the first state to the third state directly,
   wherein said connecting mechanism comprises:
      a hinge fixing unit to be attached to said operation unit casing;
      a hinge movable unit to be attached to said display unit casing;
      an annular guide groove composed by curve-shaped first and second grooves and a straight-shaped third groove, and provided in hinge fixing unit;
      a guide pin provided in said hinge movable unit moving through said annular guide groove;
      a spring that one end is connected to said guide pin, and the other end is connected to said hinge fixing unit, on said annular guide groove, three vertices are provided to place said operation unit casing and said display unit casing to correspond to each of said three states,
   wherein said spring pushes said guide pin to one of said three vertices on said annular guide groove.

2. The portable terminal device according to claim 1, wherein said first input unit provided on a bottom part of said operation unit casing is exposed in the third state and the second state.

3. The portable terminal device according to claim 1, wherein in the third state, an upper side surface of said display unit casing is located to be substantially flush with the upper part of said operation unit casing.

4. The portable terminal device according to claim 1, wherein said first and second input units are operable by one-handed operation without changing a hand which holds said operation unit casing.

5. The portable terminal device according to claim 1, wherein said operation unit casing and said display unit casing are sized in a height direction such that in the third state, said first input unit and said second input unit are operable by a thumb of a hand which holds said operation unit casing.

6. A state switching structure of a portable terminal device, wherein a connection mechanism is to allow switching among three states, a first state where a display unit casing having a second input unit formed of a display unit and a touch panel overlaps an operation unit casing having a first input unit formed of a key switch, a second state where said display unit casing slides upwardly on said operation unit casing to locate and a third state where said display unit casing is laterally positioned on an upper part of said operation unit casing,
   wherein said connecting mechanism is structured to switch from the first state to the second state directly,
   wherein said connecting mechanism is structured to switch from the first state to the third state directly,
   wherein said connecting mechanism comprises:
      a hinge fixing unit to be attached to said operation unit casing;
      a hinge movable unit to be attached to said display unit casing;
      an annular guide groove composed by curve-shaped first and second grooves and a straight-shaped third groove, and provided in hinge fixing unit;
      a guide pin provided in said hinge movable unit moving through said annular guide groove;
      a spring that one end is connected to said guide pin, and the other end is connected to said hinge fixing unit, on said annular guide groove, three vertices are provided to place said operation unit casing and said display unit casing to correspond to each of said three states,
   wherein said spring pushes said guide pin to one of said three vertices on said annular guide groove.

7. The state switching structure of a portable terminal device according to claim 6, wherein said first input unit provided on a bottom part of said operation unit casing is exposed in the third state and the second state.

8. The state switching structure of a portable terminal device according to claim 6, wherein in the third state, an upper side surface of said display unit casing is located to be substantially flush with the upper part of said operation unit casing.

9. The state switching structure of a portable terminal device according to claim 6, wherein said first and second input units are operable by one-handed operation without changing a hand which holds said operation unit casing.

10. The state switching structure of a portable terminal device according to claim 6, wherein said operation unit casing and said display unit casing are sized in a height direction such that in the third state, said first input unit and said second input unit are operable by a thumb of a hand which holds said operation unit casing.

* * * * *